United States Patent [19]

Tsai

[11] Patent Number: 5,330,273
[45] Date of Patent: Jul. 19, 1994

[54] SUPPORT MEMBER FOR HOLDING UP ROTATING ROD IN SOCCER TABLE FRAME

[76] Inventor: Lore Tsai, No. 22, Lane 20, Zen Chung Street, E. District, Taichung, Taiwan

[21] Appl. No.: 80,720

[22] Filed: Jun. 24, 1993

[51] Int. Cl.⁵ ............................................. F16C 33/04
[52] U.S. Cl. ................................... 384/215; 384/220; 384/222; 384/275; 384/296; 384/439; 384/441
[58] Field of Search ............... 384/215, 539, 220, 222, 384/275, 296, 441

[56] References Cited

U.S. PATENT DOCUMENTS

| | | | |
|---|---|---|---|
| 1,783,446 | 12/1930 | Overbury | 384/439 |
| 4,624,585 | 11/1986 | Nix et al. | 384/439 |
| 4,784,499 | 11/1988 | Fukute | 384/439 |
| 4,887,331 | 12/1989 | Thomas | 384/539 |

Primary Examiner—Lenard A. Footland
Attorney, Agent, or Firm—Browdy and Neimark

[57] ABSTRACT

A support member for use in a soccer table comprises a male retainer and a female retainer. The male retainer has a first columnar portion and a first disk portion attached to one end of the first columnar portion which is provided thereon with an arresting portion and has an axial hole. The female retainer has a second columnar portion and a second disk portion attached to one end of the second columnar portion which has an axially-oriented fitting hole provided on the inner wall surface thereof with a stopping portion. The first columnar portion of the male retainer is received in the fitting hole of the female retainer such that the arresting portion of the male retainer and the stopping portion of the female retainer engage to confine each other. There is at least one retainer, either the male retainer or the female retainer, whose disk porton is so slanted toward the columnar portion that the disk portion urges flexibly the soccer table frame at the time when the male and the female retainers are put together to hold up a rotating rod of the soccer table.

3 Claims, 2 Drawing Sheets

SUPPORT MEMBER FOR HOLDING UP ROTATING ROD IN SOCCER TABLE FRAME

FIELD OF THE INVENTION

The present invention relates generally to a soccer table, and more particularly to a support member for use in holding up a rotating rod in a soccer table frame.

BACKGROUND OF THE INVENTION

As shown in FIG. 1, a soccer table 10 of the prior art comprises a table frame 12 in which a plurality of rotating rods 14 are pivotally disposed in a parallel manner. A toy soccer ball can be moved playfully around on the surface of the table 10 by manipulating the toy soccer players fastened to the rotating rods 14. Each of the two opposite sides of the table frame 12 is provided with a plurality of through holes (not shown in the drawing) in which the rotating rods are mounted. The table frame 12 is made of wood while the rotating rods 14 are made of metal. In order to prevent the through holes of the table frame 12 from being enlarged by friction caused by the revolving action of the rotating rods 14, each of the through holes of the table frame 12 is protected by a metal lining 16, which is inserted into the through hole and provided with a passage hole (not shown in the drawing) for receiving therein the rotating rod 14.

It is therefore conceivable that the prior art soccer table 10 described above must be provided with at least thirty two pieces of the metal lining 16. In addition, each metal lining 16 must be fastened by means of three screws. In other words, a total of ninety six screws must be used to fasten all thirty two pieces of the metal lining 16. As a result, the overall cost of making the prior art soccer table 10 is rather high.

SUMMARY OF THE INVENTION

It is therefore the primary objective of the present invention to provide a soccer table with an improved support member for holding up the rotating rods of the soccer table. Such improved support member can be so easily installed as to improve the overall efficiency of making the soccer table.

The foregoing objective of the present invention is attained by a support member which comprises a male retainer and a female retainer. The male retainer has a first columnar portion and a first disk portion attached to one end of the first columnar portion which is provided thereon with an arresting portion and has an axial hole. The female retainer has a second columnar portion and a second disk portion attached to one end of the second columnar portion which has an axially-oriented fitting hole provided on the inner wall surface thereof with a stopping portion. The first columnar portion of the male retainer is received in the fitting hole of the female retainer such that the arresting portion of the male retainer and the stopping portion of the female retainer engage to confine each other. There is at least one retainer whose disk portion is so slanted toward the columnar portion that the disk portion urges flexibly the table frame at the time when the male retainer and the female retainer are put together.

DETAILED DESCRIPTION OF THE INVENTION

Figure 1:
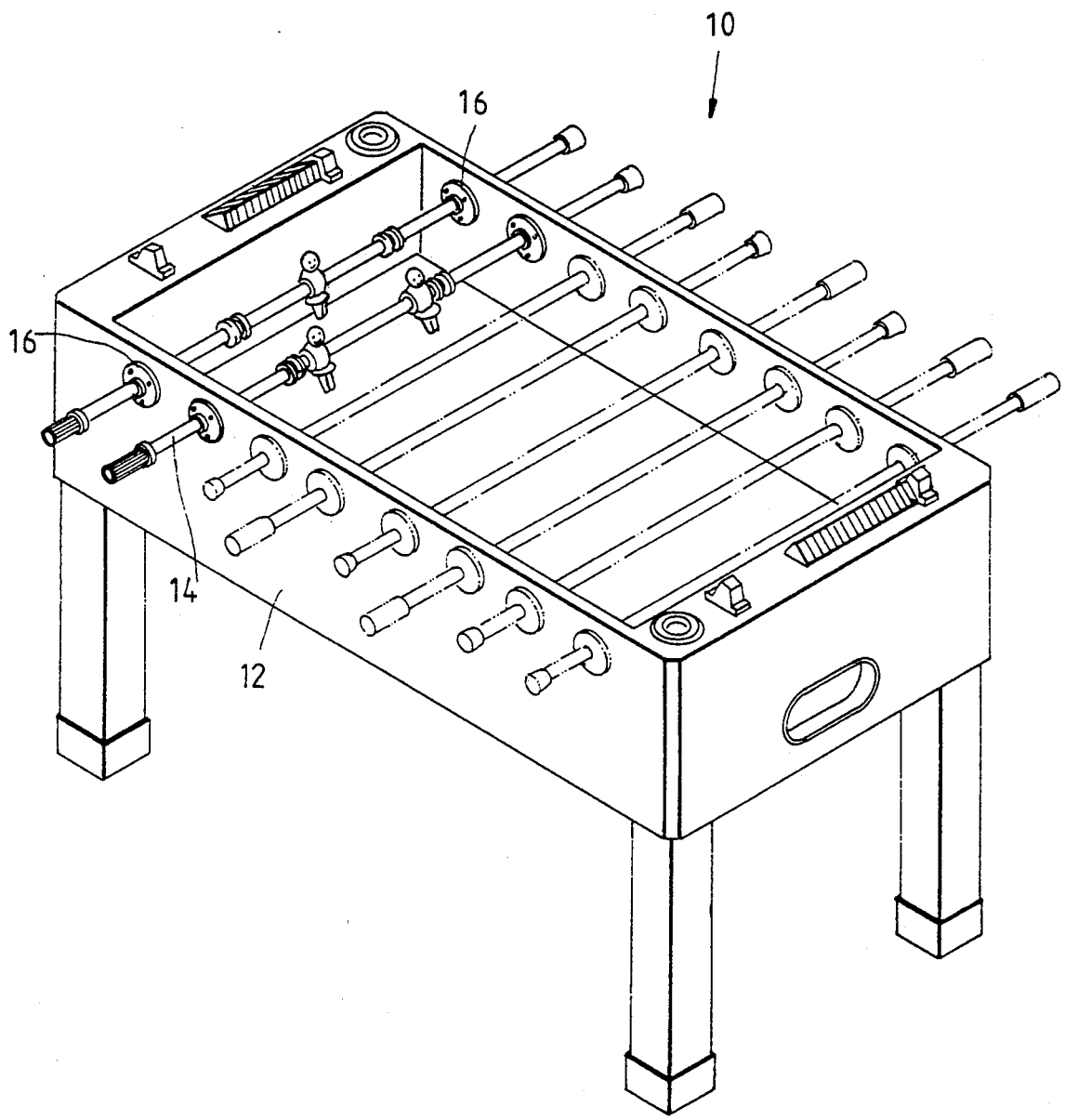
FIG. 1 shows a schematic perspective view of a soccer table of the prior art.
Figure 2:
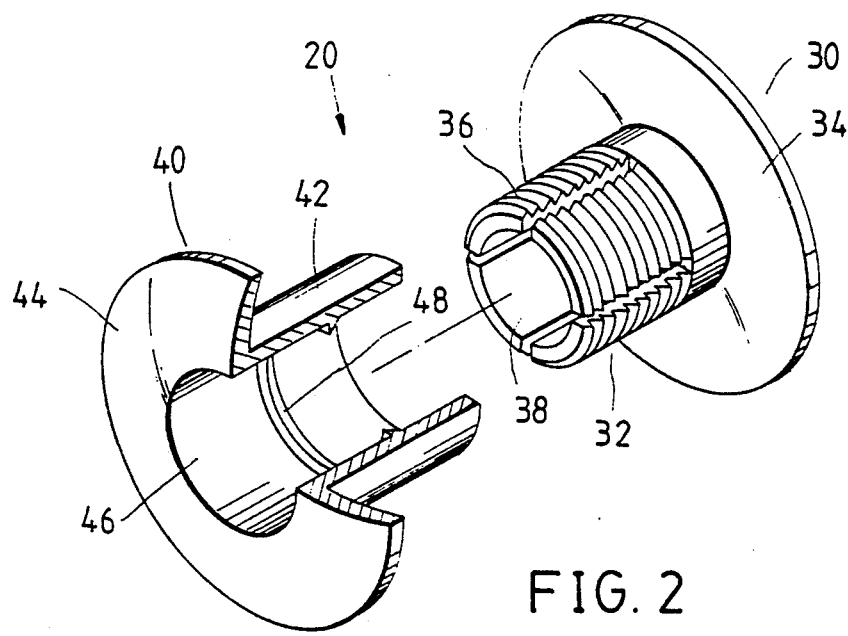
FIG. 2 shows an exploded view of a portion of a first preferred embodiment of the present invention.

As shown in FIG. 2, a support member 20 of the first preferred embodiment of the present invention comprises a male retainer 30 and a female retainer 40.

The male retainer 30 is made integrally of a plastic material and composed of a columnar portion 32 and a disk portion 34 attached to one end of the columnar portion 32 having thereon an arresting portion 36 which is ratchetlike in its cross section. The columnar portion 32 has an axial hole 38 and four grooves 39 provided thereon axially.

The female retainer 40 is made integrally of a plastic material and composed of a columnar portion 42 and a disk portion 44 attached to one end of the columnar portion 42 which has an axially-oriented fitting hole 46. Located on the inner wall surface of the fitting hole 46 is a stopping portion 48 which is ratchetlike in its cross section.

The disk portions 34 and 44 of the male and the female retainers 30 and 40 are slanted at a predetermined angle toward their respective columnar portions 32 and 42. The disk portions 34 and 44 has a thickness that is progressively thinner from the inner portion toward the outer portion.

Figure 3:
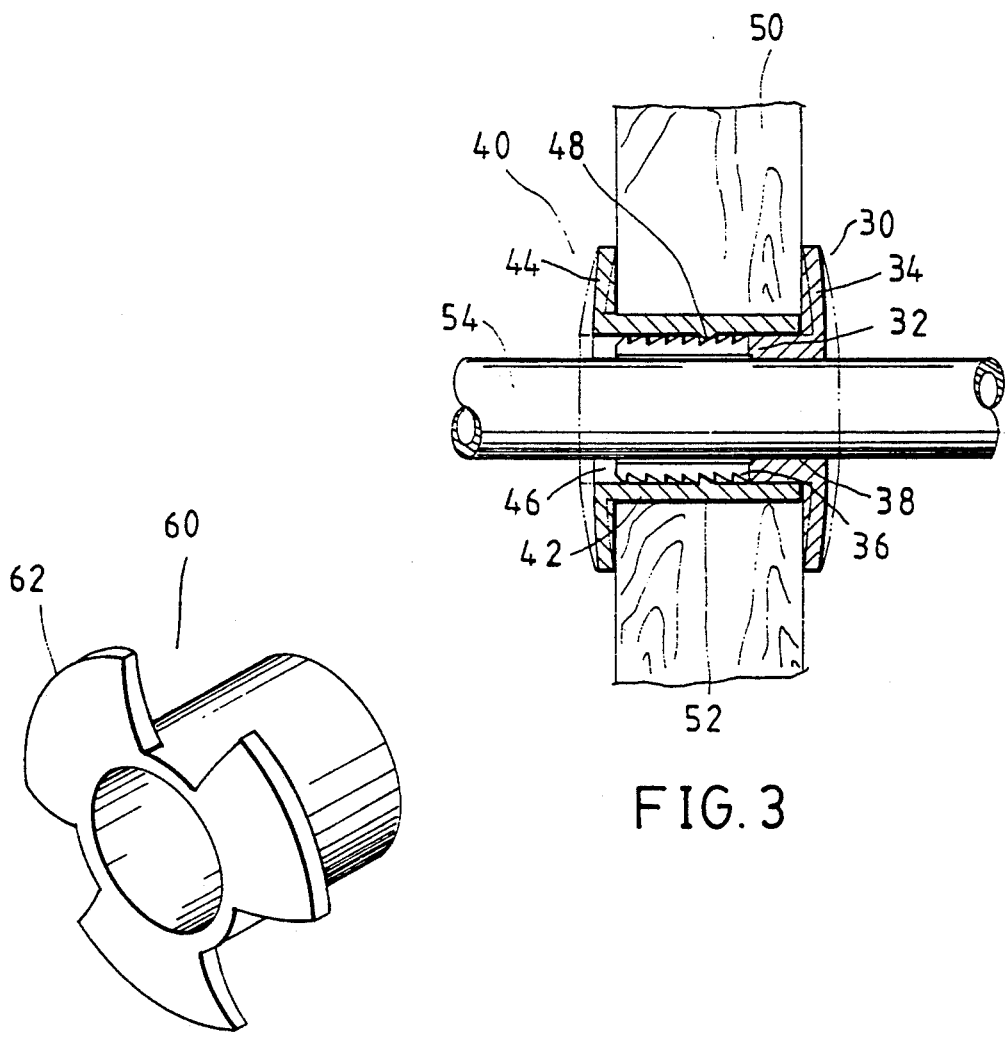
FIG. 3 is a schematic view of the portion in combination, according to the first preferred embodiment as shown in FIG. 2.

As shown in FIG. 3, the male and the female retainers 30 and 40 are fastened respectively to a table frame 50 in such a manner that the columnar portion 42 of the female retainer 40 is received in a through hole 52 of the table frame 50, and that the columnar portion 32 of the male retainer 30 is received in the fitting hole 46 of the female retainer 40, and further that the arresting portion 36 of the male retainer 30 engages the stopping portion 48 of the female retainer 40. When the arresting portion 36 and the stopping portion 48 are properly located, the disk portions 34 and 44 urge respectively the two sides of the table frame 50. In other words, the disk portions 34 and 44 are originally slanted as shown by the dotted lines in FIG. 3. However, when the disk portions 34 an 44 are caused to urge flexibly the table frame 50, the disk portions 34 and 44 are no longer slanted and are parallel to each other, as shown by the solid lines in FIG. 3. A rotating rod 54 is received in the axial hole 38 of the male retainer 30.

The male and the female retainers 30 and 40 can not be intimately attached to the table frame 50 in a perfect manner at the time when the stopping portion 48 engages the arresting portion 36 in view of the fact that each table frame is not uniform in thickness, and that both the arresting portion 36 and the stopping portion 48 have a predetermined pitch. However, the disk portions 34 and 44 of the present invention are disposed obliquely and can be caused to deform in a flexible manner. As a result, the male and the female retainers 30 and 40 can be fastened securely to the table frame 50, thanks to the disk portions 34 and 44 capable of urging the table frame 50 in a flexible manner.

Both the male and the female retainers 30 and 40 of the present invention are made of a plastic material having excellent mechanical properties to support the rotating rod 54. In addition, the plastic material of the male and the female retainers 30 and 40 has a surface capable of acting as a lubricant to minimize the mechanical friction between the support member 20 and the rotating rod 54.

Figure 4:
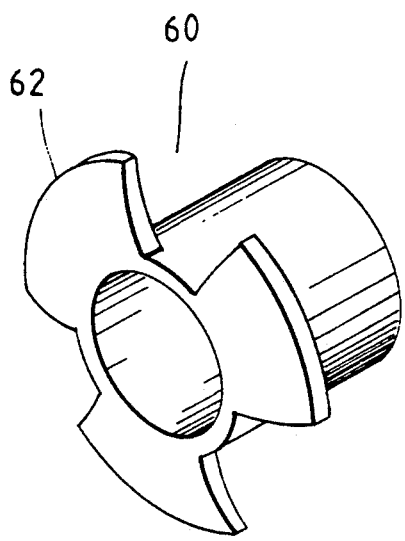
FIG. 4 shows a perspective view of a portion of a second preferred embodiment of the present invention.

The second preferred embodiment of the present invention is illustrated in FIG. 4, in which only a female retainer 60 is shown. The second preferred embodiment differs from the first preferred embodiment in that the female retainer 60 has a disk portion 62 which is made up of material sheets disposed equidistantly.

The present invention has advantages over the prior art. Such advantages are described hereinafter.

The support member of the present invention can be installed easily and rapidly, thereby resulting in a substantial reduction in the cost of making a soccer table.

The support member of the present invention can be so fastened tightly to the soccer table frame that there is devoid of a gap between the support member and the soccer table frame.

What is claimed is:

1. A support member for holding up a rotating rod in a soccer table frame comprising:

a male retainer having a first columnar portion and a first disk portion attached to one end of said first columnar portion which has an arresting portion located on a circumference thereof and which has an axial hole;

a female retainer having a second columnar portion and a second disk portion attached to one end of said second columnar portion which is provided axially with a fitting hole having a stopping portion disposed on an inner wall surface thereof;

said male retainer and said female retainer being fastened respectively to two sides of a frame of a soccer table in such a manner that said first columnar portion of said male retainer is fitted into said fitting hole of said female retainer, and that said arresting portion of said male retainer engages said stopping portion of said female retainer; and wherein said first disk portion or said second disk portion is slanted at a predetermined angle, with an outer edge of said first disk portion or said second disk portion inclining toward said first columnar portion or said second columnar portion, so as to cause said first disk portion and said second disk portion to urge flexibly said frame of said soccer table at the time when said male retainer engages said female retainer.

2. The support member according to claim 1 wherein said first disk portion and said second disk portion are made up of a predetermined number of material sheets.

3. The support member according to claim 1 wherein said first disk portion and said second disk portion have a thickness that is progressively thinner toward an outer edge from an inner portion of said first disk portion and said second disk portion.

* * * * *